C. B. SPONSLER.
Bottle-Stopper.
No. 221,874. Patented Nov. 18, 1879.
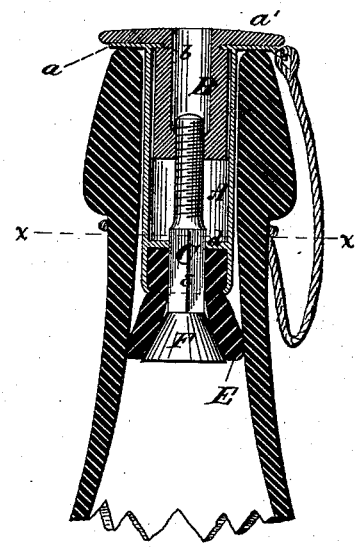
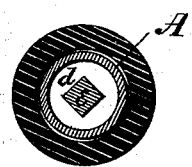
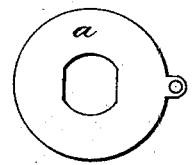
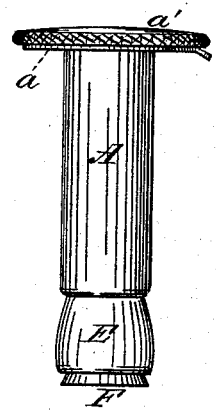
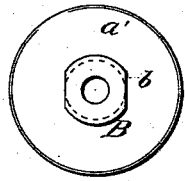
Witnesses.
John M Patterson
E H Kitzmiller
Calvin B. Sponsler,
Inventor.
by Connolly Bros & McTighe
Attorneys
N. PETERS, PHOTO-LITHOGRAPHER, WASHINGTON, D. C.

UNITED STATES PATENT OFFICE.

CALVIN B. SPONSLER, OF PITTSBURG, PENNSYLVANIA.

IMPROVEMENT IN BOTTLE-STOPPERS.

Specification forming part of Letters Patent No. 221,874, dated November 18, 1879; application filed August 30, 1879.

*To all whom it may concern:*

Be it known that I, CALVIN B. SPONSLER, of Pittsburg, in the county of Allegheny and State of Pennsylvania, have invented certain new and useful Improvements in Bottle-Stoppers; and I do hereby declare that the following is a full, clear, and exact description of the invention, which will enable others skilled in the art to which it appertains to make and use the same, reference being had to the accompanying drawings, and to letters of reference marked thereon, which form a part of this specification.

Figure 1 is a vertical section, showing stopper applied and shut. Fig. 2 is a horizontal section, $x \, x$, of Fig. 1. Fig. 3 is a top view of the shell A. Fig. 4 is a bottom view of the nut B. Fig. 5 is an elevation of my stopper complete in contracted shape for insertion.

The object of this invention is to provide a novel form of bottle-stopper; and it consists in a certain construction, combination, and arrangement, whereby the stopper, after being inserted into the neck of the bottle, may be securely fastened, but in such a manner that by an easy manipulation it may be removed without injury.

In the drawings, A designates the outside shell, of sufficient length to extend down to the narrowest part of the bottle-neck. The shell is made of any suitable material, and is formed with an annular flange, $a$, on its upper end. A portion of said flange projects inwardly, so as to enter a groove or channel, $b$, cut in the nut B, and prevent the latter from rising upward in loosening the stopper. The nut B is recessed, and has a threaded hole formed through its lower end less in diameter than the recess, and adapted to receive the threaded end of the plug-stem C, which in tightening or loosening the stopper moves in said recess.

The lower end of the shell A is provided with an internal annular flange or diaphragm, $d$, through a square hole in which passes a square enlargement or shouldered portion, E, of the plug-stem C. Below this diaphragm or flange $d$ a tubular gasket, ring, or packing, E, of rubber, is fitted in the end of the shell, and is of sufficient length to fall a slight distance below. The gasket E is made slightly bell-shaped, so as to flare to the diameter of the bottle-neck.

F is the plug, conical in shape, and fitting the interior of the lower end of the gasket E.

The operation is as follows: The parts being adjusted so as to relieve the gasket from the expanding pressure of the plug, the shell is inserted into the bottle-neck until the flange $a$ rests on the top of the neck. The nut B is then turned, and the plug-stem and plug thereby lifted, causing the gasket, from the pressure of the conical plug, to expand and tightly fill the neck. To remove the stopper the plug is turned in the reverse direction, causing the plug to lower and allowing the gasket to contract.

For convenience in operating, the plug is formed with an enlargement or head, $a'$, milled to afford a hold for the hand or fingers.

The object in making a portion of the stem square and having a corresponding hole in the flange $d$ is to prevent the stem from turning with the nut.

The device may be held to the bottle by a chain, wire, or cord attached to the flange of the shell.

Having described my invention, I claim—

1. The combination, with the shell A, having flange $d$, with angular aperture, and holding the expansible gasket E, of the threaded stem C, having an angular or shouldered portion, E, and a conical plug, F, and the recessed nut B depending within the upper part of the shell, as shown and described.

2. The shell A, having the flanges $a \, d$, in combination with the gasket E, grooved nut B, squared and threaded plug-stem C, and conical plug F, substantially as described.

In testimony that I claim the foregoing as my own I affix my signature in presence of two witnesses.

CALVIN B. SPONSLER.

Witnesses:
THOS. O'CONNOLLY,
T. J. MCTIGHE.